United States Patent
Tooyama et al.

(10) Patent No.: US 9,257,931 B2
(45) Date of Patent: Feb. 9, 2016

(54) POWER CONVERSION APPARATUS

(75) Inventors: Eiji Tooyama, Shiga (JP); Morimitsu Sekimoto, Shiga (JP); Toshiyuki Maeda, Shiga (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 261 days.

(21) Appl. No.: 13/980,285

(22) PCT Filed: Jan. 18, 2012

(86) PCT No.: PCT/JP2012/000279
§ 371 (c)(1),
(2), (4) Date: Jul. 17, 2013

(87) PCT Pub. No.: WO2012/098875
PCT Pub. Date: Jul. 26, 2012

(65) Prior Publication Data
US 2013/0300334 A1    Nov. 14, 2013

(30) Foreign Application Priority Data
Jan. 18, 2011    (JP) .................. 2011-007860

(51) Int. Cl.
*H02P 6/00*    (2006.01)
*H02J 1/00*    (2006.01)
(Continued)

(52) U.S. Cl.
CPC ............ *H02P 23/0095* (2013.01); *H02M 1/12* (2013.01); *H02P 21/05* (2013.01)

(58) Field of Classification Search
CPC ........... H02M 1/44; H02M 1/12; H02P 21/05; H02P 23/0095
USPC ............ 363/16, 17, 19, 21.02, 23, 39, 45, 40, 363/41, 46, 47, 55; 318/400.23, 400.24, 318/128, 504
See application file for complete search history.

(56) References Cited

U.S. PATENT DOCUMENTS

| | | | | |
|---|---|---|---|---|
| 6,232,731 B1 * | 5/2001 | Chapman | ............... | H02M 7/49 |
| | | | | 318/400.39 |
| 6,665,198 B2 * | 12/2003 | Tasi | .................. | H02J 3/01 |
| | | | | 307/46 |

(Continued)

FOREIGN PATENT DOCUMENTS

| JP | 4-54872 | * | 2/1992 |
|---|---|---|---|
| JP | 4-054872 A | | 2/1992 |

(Continued)

OTHER PUBLICATIONS

English translation of the International Preliminary Report on Patentability and Written Opinion of the International Searching Authority for International Application No. PCT/JP2012/000279 dated Aug. 1, 2013 (Forms PCT/IB/338, PCT/IB/373, and PCT/ISA/237).
International Search Report for PCT/JP2012/000279 dated Apr. 24, 2012.

*Primary Examiner* — Rita Leykin
(74) *Attorney, Agent, or Firm* — Birch, Stewart, Kolasch & Birch, LLP

(57) ABSTRACT

A power conversion apparatus is equipped with switching devices to perform power conversion of input AC power supplied from an AC power supply to output AC power having a predetermined voltage and a predetermined frequency, and to supply the power to a motor connected thereto. The apparatus includes a controller controlling switching of the switching devices, a capacitor smoothing a ripple generated by the switching of the switching devices, a current controller controlling a current flowing to the motor, and a voltage distortion corrector detecting a harmonic component caused by distortion in motor input power, and superimposing compensation values on an output of the current controller in accordance with a value of the harmonic component.

20 Claims, 7 Drawing Sheets

(51) Int. Cl.
*H02P 23/00* (2006.01)
*H02M 1/12* (2006.01)
*H02P 21/05* (2006.01)

(56) References Cited

U.S. PATENT DOCUMENTS

| | | | |
|---|---|---|---|
| 7,170,767 B2 * | 1/2007 | Bixel | 363/65 |
| 7,728,537 B2 * | 6/2010 | Tomigashi | 318/400.02 |
| 7,808,202 B2 * | 10/2010 | Tobari | H02P 21/0035 318/400.01 |
| 7,919,941 B2 * | 4/2011 | Aoyagi | H02M 7/53873 318/255 |
| 2004/0245949 A1 | 12/2004 | Ueda et al. | |
| 2009/0164047 A1 * | 6/2009 | Hwang et al. | 700/275 |

FOREIGN PATENT DOCUMENTS

| | | | |
|---|---|---|---|
| JP | 5-176584 A | | 7/1993 |
| JP | 11-089297 A | | 3/1999 |
| JP | 2000-287481 A | | 10/2000 |
| JP | 2002-51589 | * | 2/2002 |
| JP | 2002-051589 A | | 2/2002 |
| JP | 2004-032944 A | | 1/2004 |
| JP | 2004-080906 A | | 3/2004 |
| JP | 2004-350496 | * | 12/2004 |
| JP | 2004-350496 A | | 12/2004 |
| JP | 2006-262700 A | | 9/2006 |
| JP | 2008-219966 A | | 9/2008 |

* cited by examiner

POWER CONVERSION APPARATUS

TECHNICAL FIELD

The present disclosure relates to power conversion apparatuses converting input power to predetermined power by switching.

BACKGROUND ART

Some motors used in an electric compressor etc., of an air conditioning apparatus contain a harmonic component, which is five or seven times the fundamental frequency component, in an induced voltage. In conventional control, an inverter circuit supplying power to a motor is controlled so that the waveform of a phase current flowing to the motor is a sine wave. However, in this control, the motor current may be distorted under the influence of distortion in a motor voltage to cause a torque ripple.

To address this problem, a technique is suggested, which reduces a torque ripple of a motor by preparing a compensation voltage component for cancelling the torque ripple in advance in a table, and adding the compensation voltage to a voltage reference. (See, for example, PATENT DOCUMENT 2.)

On the other hand, in an inverter such as what is called a "capacitorless inverter" (see, e.g., PATENT DOCUMENT 1), which does not include any energy storage element inside, the energy input to the inverter contains a harmonic component when a torque ripple occurs. Then, power-supply harmonic regulations are not satisfied (herein, a power-supply harmonic is a harmonic contained in an input current). To address the problem, a technique is suggested, which reduces current distortion or the torque ripple by controlling the harmonic component of a motor current extra. (See, for example, PATENT DOCUMENT 3.)

CITATION LIST

Patent Document

PATENT DOCUMENT 1: Japanese Patent Publication No. 2002-51589
PATENT DOCUMENT 2: Japanese Patent Publication No. 2008-219966
PATENT DOCUMENT 3: Japanese Patent Publication No. 2006-262700

SUMMARY OF THE INVENTION

Technical Problem

However, as the example of PATENT DOCUMENT 2, in the compensation voltage prepared in advance in the table, an error may occur in the voltage to be compensated depending on the operational state (e.g., the rotational speed or the load torque) of the motor. As a result, current distortion or the torque ripple are not reduced.

The present disclosure was made in view of the problems. It is an objective of the present disclosure to reduce power-supply harmonics caused by distortion in a motor voltage in accordance with the operational state (e.g., the rotational speed or the load torque) of a motor in a power conversion apparatus.

Solution to the Problem

In order to achieve the objective, according to a first aspect of the invention, a power conversion apparatus is equipped with switching devices (Su, Sv, Sw, Sx, Sy, and Sz) to perform power conversion of input AC power supplied from an AC power supply (6) to output AC power having a predetermined voltage and a predetermined frequency, and to supply the output AC power to a motor (7) connected thereto. The apparatus includes a controller (5) configured to control switching of the switching devices (Su, Sv, Sw, Sx, Sy, and Sz); a capacitor (3a) configured to smooth a ripple generated by the switching of the switching devices (Su, Sv, Sw, Sx, Sy, and Sz); a current controller (53) configured to control a current flowing to the motor (7); and a voltage distortion corrector (54) configured to detect a harmonic component caused by distortion in input power to the motor, and to superimpose compensation values ($vd\_h$ and $vq\_h$) on an output of the current controller (53) in accordance with a value of the harmonic component.

In this configuration, the compensation values are superimposed on the output of the current controller (53) in accordance with the harmonic component caused by the distortion in the input power to the motor. This prevents distortion in the input power, current at the power supply, the power, and the DC link voltage of the motor.

According to a second aspect of the invention, in the power conversion apparatus according to the first aspect, the voltage distortion corrector (54) extracts the harmonic component from the input power to the motor (7).

In this configuration, the controller (5) actually detects distortion in the input power, and corrects the compensation voltages ($vd\_h$ and $vq\_h$) in accordance with the detected distortion.

According to a third aspect of the invention, in the power conversion apparatus according to the first aspect, the voltage distortion corrector (54) extracts the harmonic component from a voltage of the capacitor (3a).

In this configuration, the harmonic component is extracted from the voltage of the capacitor (3a). This easily determines the magnitude of the harmonic component.

According to a fourth aspect of the invention, in the power conversion apparatus according to the first aspect, the voltage distortion corrector (54) extracts the harmonic component from an input current to the power conversion apparatus.

In this configuration, the harmonic component is extracted from the input current.

According to a fifth aspect of the invention, in the power conversion apparatus of any one of the second to fourth aspects, the voltage distortion corrector (54) performs Fourier transform based on a period of an integral multiple of a half period of the AC power supply (6) to extract the harmonic component.

In this configuration, the harmonic component is extracted by the Fourier transform. This enables accurate determination of the magnitude of the harmonic component. In addition, in this configuration, the Fourier transform is performed based on the integral multiple of the half period of the AC power supply (6), thereby properly extracting a desired frequency component.

According to a sixth aspect of the invention, in the power conversion apparatus of any one of the second to fifth aspects, the voltage distortion corrector (54) adjusts the compensation values ($vd\_h$ and $vq\_h$) in accordance with an increase/decrease in the harmonic component before and after changing the compensation values ($vd\_h$ and $vq\_h$).

In this configuration, the compensation voltages ($vd\_h$ and $vq\_h$) are adjusted by what is called a "hill climbing method."

According to a seventh aspect of the invention, in the power conversion apparatus of any one of the second to sixth aspects, each of the compensation values ($vd\_h$ and $vq\_h$) has a frequency component which is 6n times, where n is an integer, a fundamental frequency of a voltage of the motor (7).

In this configuration, the compensation voltages (vd_h and vq_h) are set so as to reduce a relatively high harmonic component. In this configuration, the compensation voltages (vd_h and vq_h) are easily adjusted.

According to an eighth aspect of the invention, in the power conversion apparatus of any one of the second to seventh aspects, the voltage distortion corrector (54) adjusts amplitude of the compensation values (vd_h and vq_h) in accordance with any one of rotational speed, a torque, or the electric power of the motor (7).

In this configuration, the output voltage of the power conversion apparatus is controlled by adjusting the amplitude of the compensation voltages (vd_h and vq_h).

According to a ninth aspect of the invention, in the power conversion apparatus of any one of the second to seventh aspects, the voltage distortion corrector (54) adjusts at least one of phases or amplitude of the compensation values (vd_h and vq_h).

In this configuration, the output voltage of the power conversion apparatus is controlled by adjusting the phases or the amplitude of the compensation values (vd_h and vq_h).

According to a tenth aspect of the invention, the power conversion apparatus of any one of the first to ninth aspects further includes a converter circuit (2) configured to perform full-wave rectification of the input AC power. The capacitor (3a) is connected in parallel between outputs of the converter circuit (2) to form a DC link (3) and outputs a pulsating DC voltage ($v_{dc}$). The switching devices (Su, Sv, Sw, Sx, Sy, and Sz) form an inverter circuit (4) to convert an output of the DC link (3) to AC power by the switching and to supply the AC power to the motor (7). The controller (5) controls the switching so that currents ($i_u$, $i_v$, and $i_w$) of the motor (7) pulsate in synchronization with pulsation of a power-supply voltage ($v_m$).

In this configuration, in what is called a "capacitorless inverter circuit," the compensation voltages (vd_h and vq_h) are adjusted to reduce the harmonic component contained at the power supply.

Advantages of the Invention

According to the first aspect of the invention, in the power conversion apparatus, the power-supply harmonic caused by distortion in the motor voltage is reduced in accordance with the operational state of the motor.

According to the second and third aspects of the invention, the magnitude of the harmonic component is easily determined.

According to the fourth aspect of the invention, the harmonic component of the input current, which is a target of power-supply harmonic regulations, is directly detected, thereby effectively reducing the power-supply harmonic.

According to the fifth aspect of the invention, the magnitude of the desired harmonic component is accurately determined, thereby more reliably reducing the power-supply harmonic.

According to the sixth aspect of the invention, the appropriate compensation voltages (vd_h and vq_h) are set, thereby more reliably reducing the power-supply harmonic.

According to the seventh aspect of the invention, the compensation voltages (vd_h and vq_h) are set so as to reduce a relatively high harmonic component, thereby more effectively reducing the power-supply harmonic.

According to the eighth aspect of the invention, distortion in the input power, the current at the power supply, the power, and the DC link voltage of the motor is prevented.

According to the ninth aspect of the invention, distortion in the input power, the current at the power supply, the power, and the DC link voltage of the motor is more precisely prevented.

According to the tenth aspect of the invention, in what is called a "capacitorless inverter circuit," the power-supply harmonic caused by distortion in the motor voltage is reduced.

DESCRIPTION OF EMBODIMENTS

Figure 1:
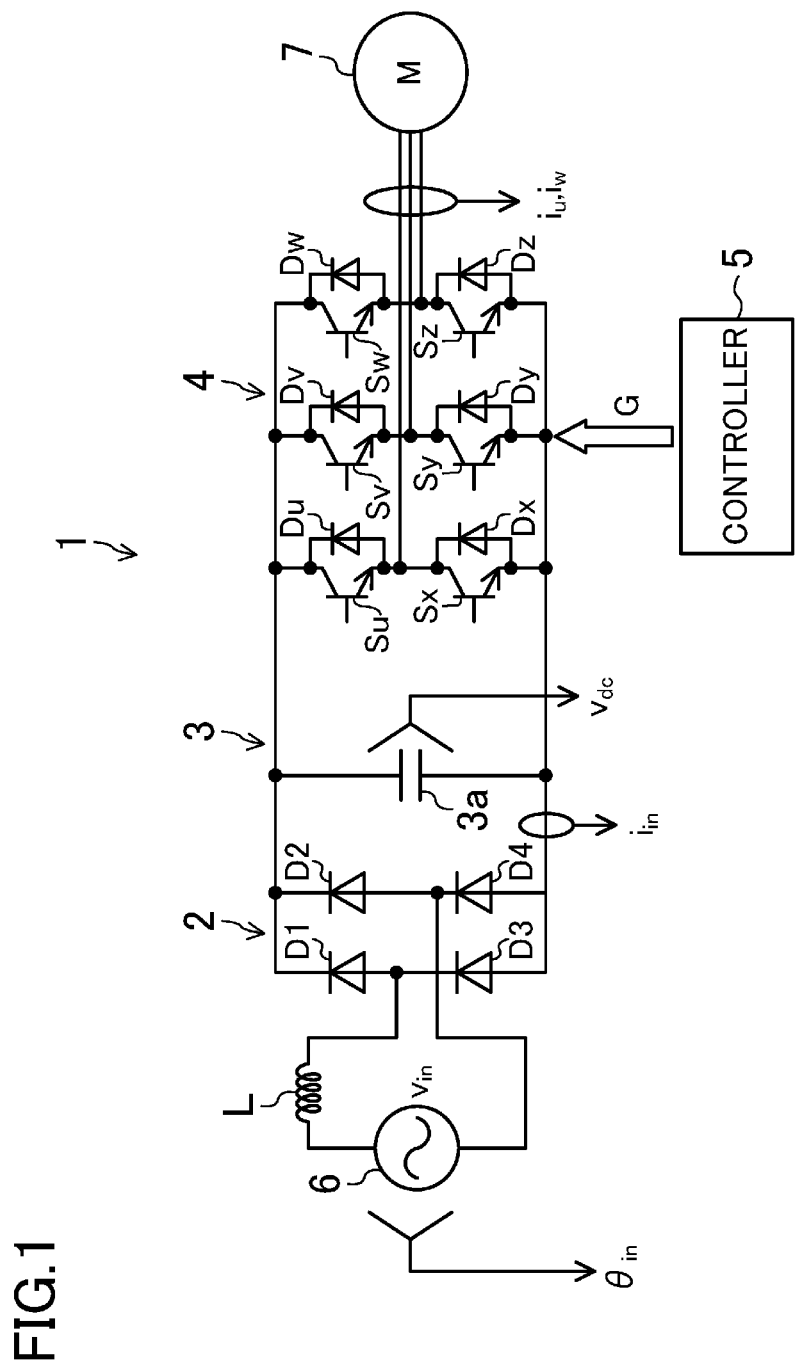
FIG. 1 is a block diagram illustrating the configuration of a power conversion apparatus according to an embodiment of the present disclosure.

Embodiments of the present disclosure will be described below in detail with reference to drawings. Note that the embodiments described below will be set forth merely for the purpose of preferred examples in nature, and are not intended to limit the scope, applications, and use of the invention.
Entire Configuration FIG. 1 is a block diagram illustrating the configuration of a power conversion apparatus (1) according to an embodiment of the present disclosure. As shown in the figure, the power conversion apparatus (1) includes a converter circuit (2), a DC link (3), an inverter circuit (4), and a controller (5). The power conversion apparatus (1) converts AC power supplied from a single-phase AC power supply (6) into power having a predetermined frequency, and then supplies the power to a motor (7).

The motor (7) according to this embodiment is a three-phase AC motor for driving a compressor provided in a refrigerant circuit of an air conditioning apparatus. More specifically, the motor (7) is a 4-pole 6-slot concentrated winding motor. This motor (7) tends to contain a number of quinary and septenary components of a fundamental wave as harmonic components of an induced voltage. These harmonic components caused by distortion in a motor voltage appear in a power-supply current and a DC link voltage, which will be described later.

<Converter Circuit (2)>

The converter circuit (2) is connected to the AC power supply (6) via a reactor (L) and performs full-wave rectification of AC output from the AC power supply (6) into DC. In this example, the converter circuit (2) is a diode bridge circuit in which a plurality of (four in this embodiment) diodes (D1-D4) are connected together in a bridge configuration. The diodes (D1-D4) perform full-wave rectification of an AC voltage of the AC power supply (6) to a DC voltage.

<DC link (3)>

The DC link (3) includes a capacitor (3a). The capacitor (3a) is connected in parallel to outputs of the converter circuit (2). A DC voltage (i.e., a DC link voltage ($v_{dc}$)) generated at both ends of the capacitor (3a) is applied to input nodes of the inverter circuit (4). The capacitor (3a) is, for example, a film capacitor. This capacitor (3a) has electrostatic capacitance smoothing only a ripple voltage (i.e., a voltage fluctuation) generated in accordance with a switching frequency, when switching devices of the inverter circuit (4), which will be described later, perform switching. That is, the capacitor (3a) is a low-capacitance capacitor, which does not have electrostatic capacitance smoothing the voltage rectified by the converter circuit (2) (i.e., the voltage fluctuation caused by a power-supply voltage). Therefore, the DC link voltage ($v_{dc}$) output from the DC link (3) has large pulsation such that its maximum value is twice or more the minimum value.

<Inverter Circuit (4)>

The input nodes of the inverter circuit (4) are connected in parallel to the capacitor (3a) of the DC link (3). The inverter circuit (4) coverts an output of the DC link (3) into three-phase AC by switching, and supplies the AC to the motor (7) connected thereto. In the inverter circuit (4) according to this embodiment, a plurality of switching devices are connected together in a bridge configuration. This inverter circuit (4) outputs the three-phase AC to the motor (7), and thus has six switching devices (Su, Sv, Sw, Sx, Sy, and Sz). Specifically, the inverter circuit (4) includes three switching legs in each of which two of the switching devices are connected together in series. Each of the switching legs is connected to a phase coil (not shown) of the motor (7) at a middle point between the upper-arm switching device (Su, Sv, or Sw) and the lower-arm switching device (Sx, Sy, or Sz). Each of free-wheeling diodes (Du, Dv, Dw, Dx, Dy, and Dz) are connected in inverse-parallel with a corresponding one of the switching devices (Su, Sv, Sw, Sx, Sy, and Sz). The inverter circuit (4) performs on/off operation of the switching devices (Su, Sv, Sw, Sx, Sy, Sz) to convert the DC link voltage ($v_{dc}$) input from the DC link (3) into the three-phase AC voltage, and then supplies the voltage to the motor (7). The controller (5) controls the on/off operation.

<Controller (5)>

Figure 2:
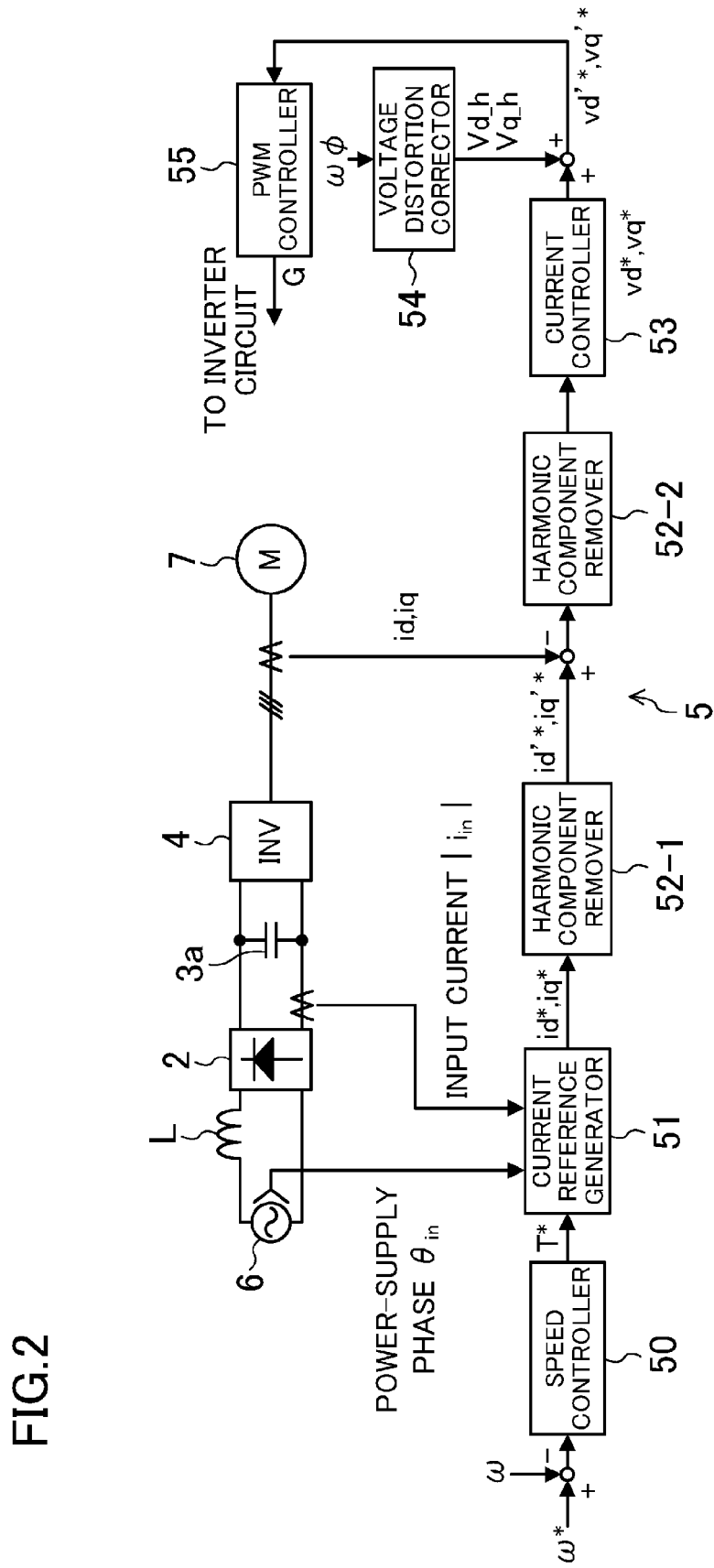
FIG. 2 is a block diagram illustrating an example configuration of a controller.

The controller (5) controls the switching (on/off operation) in the inverter circuit (4) so that currents (i.e., motor currents ($i_u$, $i_v$, and $i_w$)) flowing to the motor (7) pulsate in synchronization with the pulsation of a power-supply voltage ($v_{in}$). That is, the power conversion apparatus (1) is an example of what is called a "capacitorless inverter." FIG. 2 is a block diagram illustrating an example configuration of the controller (5). In this example, the controller (5) includes a speed controller (50), a current reference generator (51), harmonic component removers (52), a dq-axis current controller (53) (simply shown as a "current controller" in the figure), a voltage distortion corrector (54), and a PWM controller (55).

—Speed Controller (50)—

The speed controller (50) obtains deviation of the rotation angle frequency (ωm) of the mechanical angle of the motor (7) from the reference value (ωm*) of the mechanical angle, and performs proportional/integral operation (PI operation) of the deviation to output a torque reference value (T*) to the current reference generator (51).

—Current Reference Generator (51)—

Figure 3:
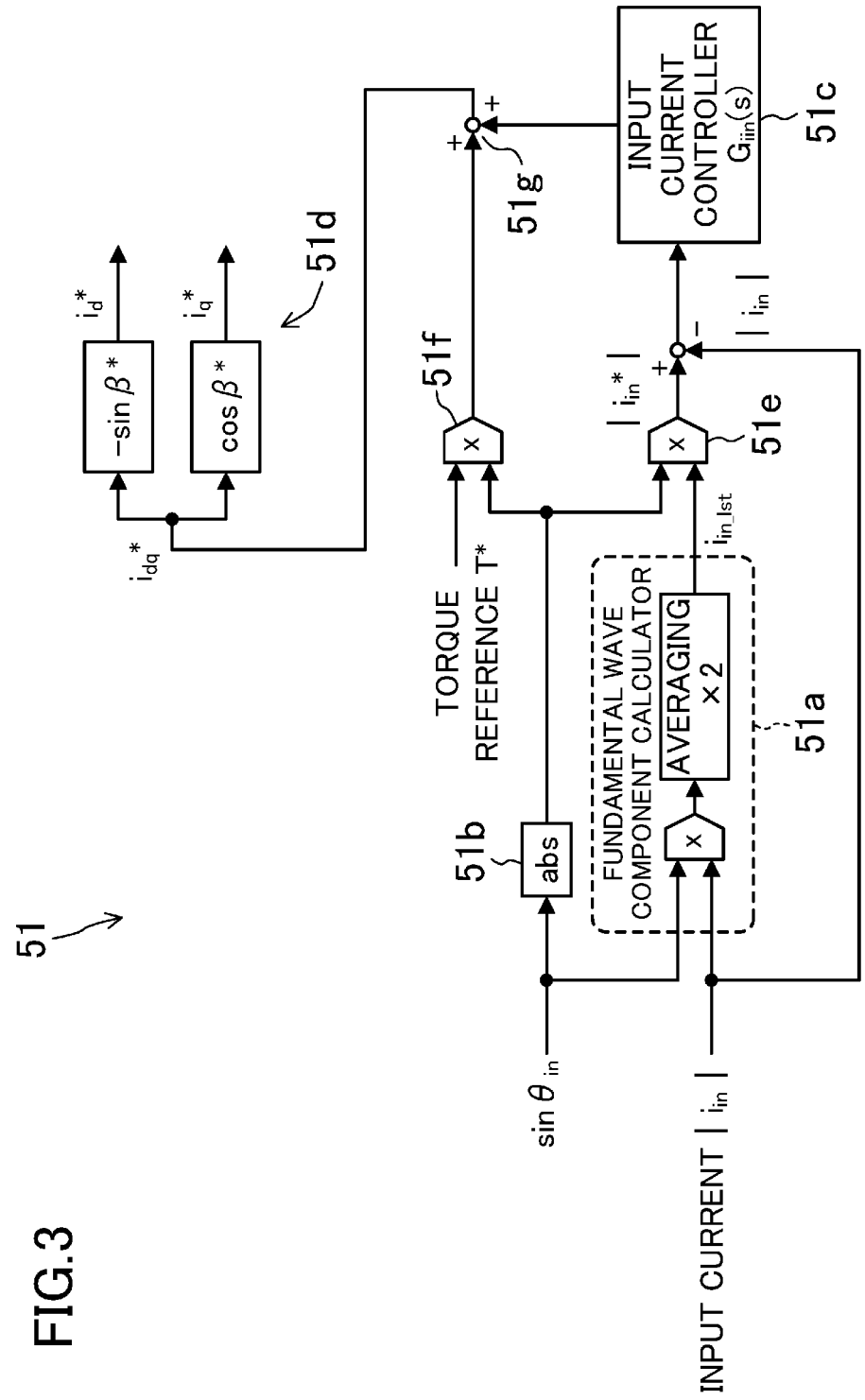
FIG. 3 is a block diagram illustrating an example configuration of a current reference generator.

FIG. 3 is a block diagram illustrating an example configuration of the current reference generator (51). As shown in the figure, the current reference generator (51) includes a fundamental wave component calculator (51a), an absolute value calculator (51b) (simply shown as "abs" in FIG. 3), an input current controller (51c), a dq current reference value generator (51d), multipliers (51e and 51f), and an adder (51g). The torque reference value (T*), a sine value ($\sin(\theta_{in})$) of the phase angle ($\theta_{in}$) of the power-supply voltage ($v_{in}$), and the absolute value ($|i_{in}|$) of an input current ($i_{in}$) are input to the current reference generator (51).

In this current reference generator (51), the fundamental wave component calculator (51a) performs Fourier transform to extract a fundamental wave component of the power-supply voltage from the absolute value of the input current ($i_{in}$) during the period of an integral multiple of the half period of the AC power supply (6). As such, the Fourier transform is performed for the period of the integral multiple of the half period of the AC power supply (6), thereby properly extracting a desired frequency component. In this example, specifically, the fundamental wave component calculator (51a) obtains as a first value ($i_{in\_1st}$), the doubled value of the average of the product of $\sin(\theta_{in})$ and the input current ($i_{in}$).

The absolute value calculator (51b) obtains the absolute value of $\sin(\theta_{in})$. The multiplier (51e) multiplies the absolute value of $\sin(\theta_{in})$ by the first value ($i_{in\_1st}$) to obtain a reference value ($|i_{in}*|$) of the absolute value of the input current.

The input current controller (51c) generates the reference value to reduce the deviation of the reference value ($|i_{in}*|$) of the absolute value of the input current ($i_{in}$) from the absolute value ($|i_{in}|$) of the input current ($i_{in}$).

The multiplier (51f) multiplies the absolute value of $\sin(\theta_{in})$ by the torque reference value (T*). This multiplication result pulsates at the frequency which is twice the power-supply frequency. The multiplication result is input to the adder (51g). The adder (51g) adds the output of the multiplier (51f) to the reference value output from the input current controller (51c). The addition result is input as a current reference value ($i_{dq}*$) to the dq current reference value generator (51d).

The dq current reference value generator (51d) obtains a d-axis current reference value ($i_d*$) and a q-axis current reference value ($i_q*$) from the current reference value ($i_{dq}*$) and a current phase reference value (β*), which will be described later, and outputs the obtained values to one of the harmonic component removers (52). Specifically, the dq current reference value generator (51d) multiplies the current reference value ($i_{dq}*$) by the negative sine value ($-\sin\beta*$) and the cosine value ($\cos\beta*$) of the predetermined value (β*) to generate the d-axis current reference value ($i_d*$) and the q-axis current reference value ($i_q*$), respectively. The value β* is a phase-β reference value of a current flowing to the motor (7).

—Harmonic Component Remover (52)—

Figure 4:
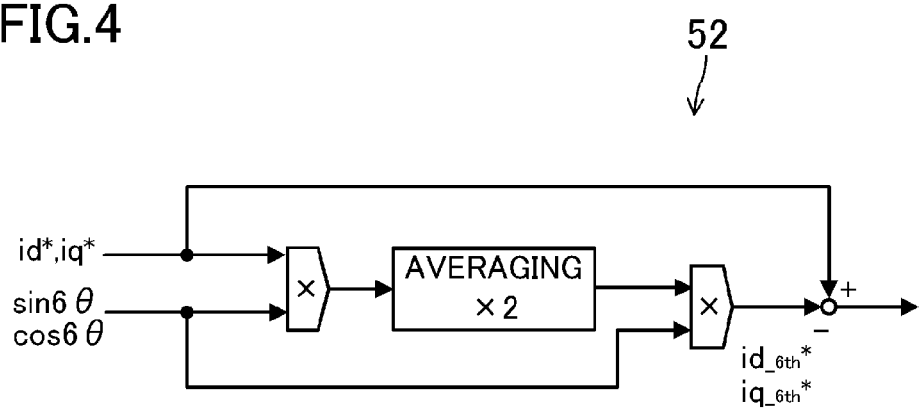
FIG. 4 is a block diagram illustrating an example configuration of a harmonic component remover.

The harmonic component removers (52) reduce harmonic components caused by distortion in a motor current from an input signal. As shown in FIG. 2, the harmonic component removers (52) are provided in two portions. In FIG. 2, etc., suffix numbers (−1, and −2) are attached to the reference numerals to distinguish the removers from each other. FIG. 4 is a block diagram illustrating an example configuration of a harmonic component remover (52). FIG. 4 exemplifies the harmonic component remover (52-1) connected to the current reference generator (51). The harmonic component remover (52-1) receives current values ($i_d^*$ and $i_q^*$). The harmonic component remover (52-2) differs from the harmonic component remover (52-1) in that the input signals are the deviation of current reference values (id'* and iq'*) from the actual current values (id and iq).

The harmonic component remover (52-1) performs Fourier transform based on the period of an integral multiple of the half period of the AC power supply (6) to extract the senary components of the voltage of the motor (7) from the current values ($i_d^*$ and $i_q^*$). Specifically, the harmonic component remover (52-1) obtains the doubled value of the average between the product of the d-axis current reference value ($i_d^*$) and sin (6θ), and the product of the d-axis current reference value ($i_d^*$) and cos (6θ). Then, the harmonic component remover (52-1) adds the obtained value to the product of sin (6θ) and cos (6θ) to obtain the senary component ($id\_{6th}^*$) of the d-axis current reference value ($i_d^*$). The reference character θ represents the phase of the fundamental wave component of the voltage of the motor (7). The harmonic component remover (52-1) outputs a value obtained by subtracting the senary component ($id\_{6th}^*$) from the d-axis current reference value ($i_d^*$). That is, where the doubled value of the average of the product id*×sin 6θ is id_sin 6θ, and the doubled value of the average of the product id*×cos 6θ is id_cos 6θ, $id\_{6th}^*$ is expressed as follows.

$$id\_{6th}^* = id\_sin\ 6\theta \times sin\ 6\theta + id\_cos\ 6\theta \times cos\ 6\theta$$

The harmonic component remover (52-1) adds the product of the q-axis current reference value ($i_q^*$) and sin (6θ) to the product of the q-axis current reference value ($i_q^*$) and cos (6θ), obtains the doubled value of the average, and adds the doubled value to the product of sin (6θ) and cos (6θ) to obtain the senary component ($iq\_{6th}^*$) of the q-axis current reference value ($i_q^*$). The harmonic component remover (52-1) outputs the value obtained by subtracting the senary component ($iq\_{6th}^*$) from the q-axis current reference value ($i_q^*$).

The harmonic component caused by distortion in a motor current contains a frequency component which is 6n times, where n is an integer, the frequency (fundamental frequency (θ)) of the fundamental wave of the voltage of the motor (7).

—dq-Axis Current Controller (53)—

The dq-axis current controller (53) is an example of the current controller of the present invention. The dq-axis current controller (53) generates voltage reference values (vd* and vq*) to reduce the deviation of the current reference values (id'* and iq'*) of the motor currents ($i_u$, $i_v$, and $i_w$) from the actual current values (id and iq). The dq-axis current controller (53) has a bandwidth smaller than the frequency components of compensation voltages (vd_h and vq_h), which will be described later. This is for damping a response in the current control to the harmonic component of the motor current caused by distortion in the motor voltage.

—Voltage Distortion Corrector (54)—

The controller (5) adjusts the voltage reference values (vd* and vq*) to the inverter circuit (4) using compensation value (i.e., the compensation voltages (vd_h and vq_h), which will be described later) to reduce the harmonic component, which will be described later, contained at the power supply caused by the distortion in the motor voltage. The voltage distortion corrector (54) generates the compensation voltages (vd_h and vq_h).

Figure 5:
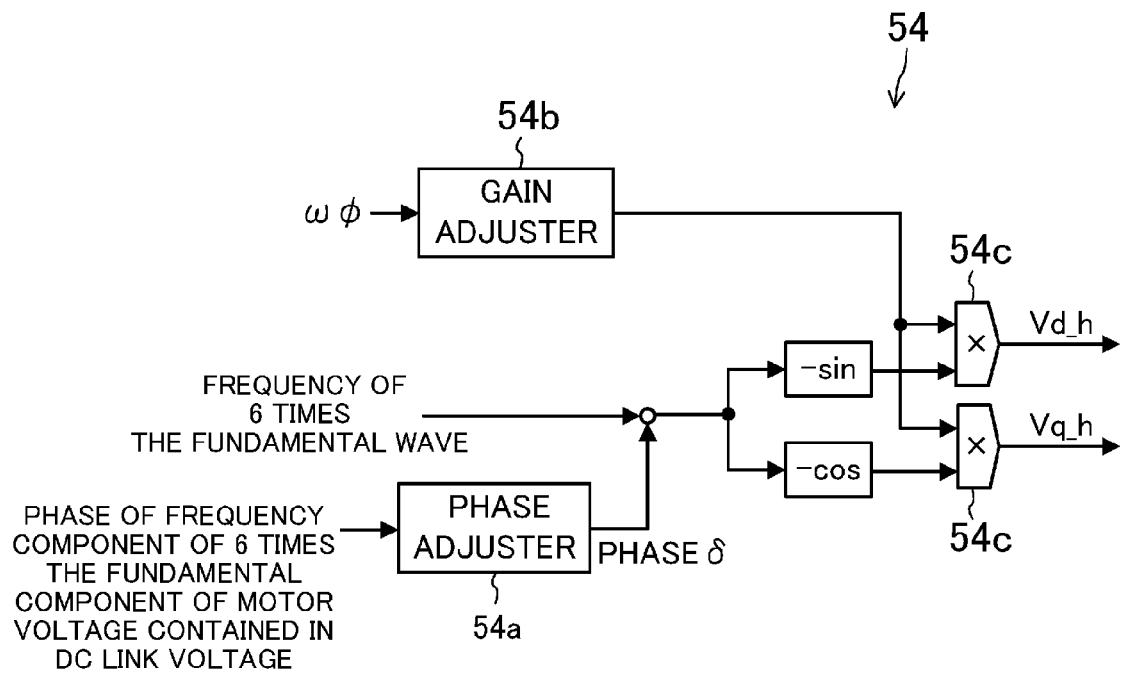
FIG. 5 is a block diagram illustrating an example configuration of a voltage distortion corrector.

FIG. 5 is a block diagram illustrating an example configuration of the voltage distortion corrector (54). As shown in the figure, the voltage distortion corrector (54) includes a phase adjuster (54a), a gain adjuster (54b), and multipliers (54c). The voltage distortion corrector (54) extracts a signal (i.e., the harmonic component caused by the distortion in the motor voltage) having a frequency (i.e., the frequency which is six times the fundamental frequency) of six times the fundamental wave component of an induced voltage contained in the DC link voltage ($v_{dc}$). Specifically, the voltage distortion corrector (54) performs Fourier transform of the DC link voltage ($v_{dc}$) to obtain the frequency component which is six times the fundamental frequency. The voltage distortion corrector (54) receives ωφ. This ωφ is a no-load induced voltage.

After the gain adjuster (54b) adjusts the gain of ωφ, the signal is multiplied by cos (6θ). (Hereinafter the multiplication result is referred to as voltage amplitude (Vh).)

The phase adjuster (54a) detects the phase (δ) of the frequency component, which is six times the fundamental wave component of the motor voltage contained in the DC link voltage ($v_{dc}$), and outputs the phase after adjustment, which will be described later. The output of the phase adjuster (54a) is added to 6θ. As a result, the result of (6θ+δ) is obtained.

The voltage distortion corrector (54) obtains the product of −sin (6θ+δ) and the voltage amplitude (Vh) to generate the d-axis compensation voltage (vd_h) for correcting the d-axis voltage reference value ($v_d'$). The voltage distortion corrector (54) also obtains the product of −cos (6θ+δ) and the voltage amplitude (Vh) to generate the q-axis compensation voltage (vq_h) for correcting the q-axis voltage reference value ($v_q^*$). In this example, each of the compensation voltages (vd_h and vq_h) contains a frequency component which is 6n times, where n is an integer, the frequency (i.e., a fundamental frequency phase (θ)) of the fundamental wave of the voltage of the motor (7). The d-axis compensation voltage (vd_h) and the q-axis compensation voltage (vq_h) are added to the d-axis voltage reference value ($v_d^*$) and the q-axis voltage reference value ($v_q^*$) output from the dq-axis current controller (53), respectively, and output as a new d-axis voltage reference value (vd'*) and a new q-axis voltage reference value (vq'*) to the PWM controller (55). That is, the voltage reference values (vd'* and vq'*) output to the PWM controller (55) are compensated in accordance with the harmonic component. In this embodiment, the compensation voltages (vd_h and vq_h) are changed to reduce the harmonic component contained at the power supply and caused by the distortion in the motor voltage. More specifically, the value of the phase (δ) is adjusted as will be described later.

—PWM Controller (55)—

The PWM controller (55) receives the d-axis voltage reference value (vd'*), the q-axis voltage reference value (vq'*), the DC link voltage ($v_{dc}$), and the rotation angle (i.e., the electrical angle (θe)) of a rotor (not shown) of the motor (7). The PWM controller (55) generates gate signals (G) for controlling the on/off operation of the switching devices (Su, Sv, Sw, Sx, Sy, and Sz) based on these values.

Operation of Power Conversion Apparatus (1)

Outline

In this embodiment, since the DC link (3) includes the low-capacitance capacitor (3a), the DC link voltage ($v_{dc}$) pulsates more largely. The pulsation of the DC link voltage ($v_{dc}$) increases the current conduction widths of the diodes (D1-D4) in the converter circuit (2). As a result, the power factor improves. The controller (5) controls switching in the inverter circuit (4) so that the motor currents ($i_u$, $i_v$, and $i_w$) pulsate in synchronization with the pulsation of the power-supply voltage ($v_{10}$).

Operation of Controller (5)

In this embodiment, the harmonic component remover (52) of the controller (5) reduces the harmonic component caused by distortion in the motor current input to the dq-axis current controller (53). Specifically, the harmonic component remover (52-1) performs Fourier transform in the period of an integral multiple of the half period of the AC power supply (6) to extract the senary components of the voltage of the motor (7) from the current values ($i_d$* and $i_q$*). The harmonic component remover (52-1) subtracts the extracted senary components ($id\_{6th}$* and $iq\_{6th}$*) from the current values ($i_d$* and $i_q$*) to generate the new current reference values (id'* and iq'*). As a result, the signals with the reduced harmonic components caused by distortion in the motor current are input to the dq-axis current controller (53).

Figure 6:
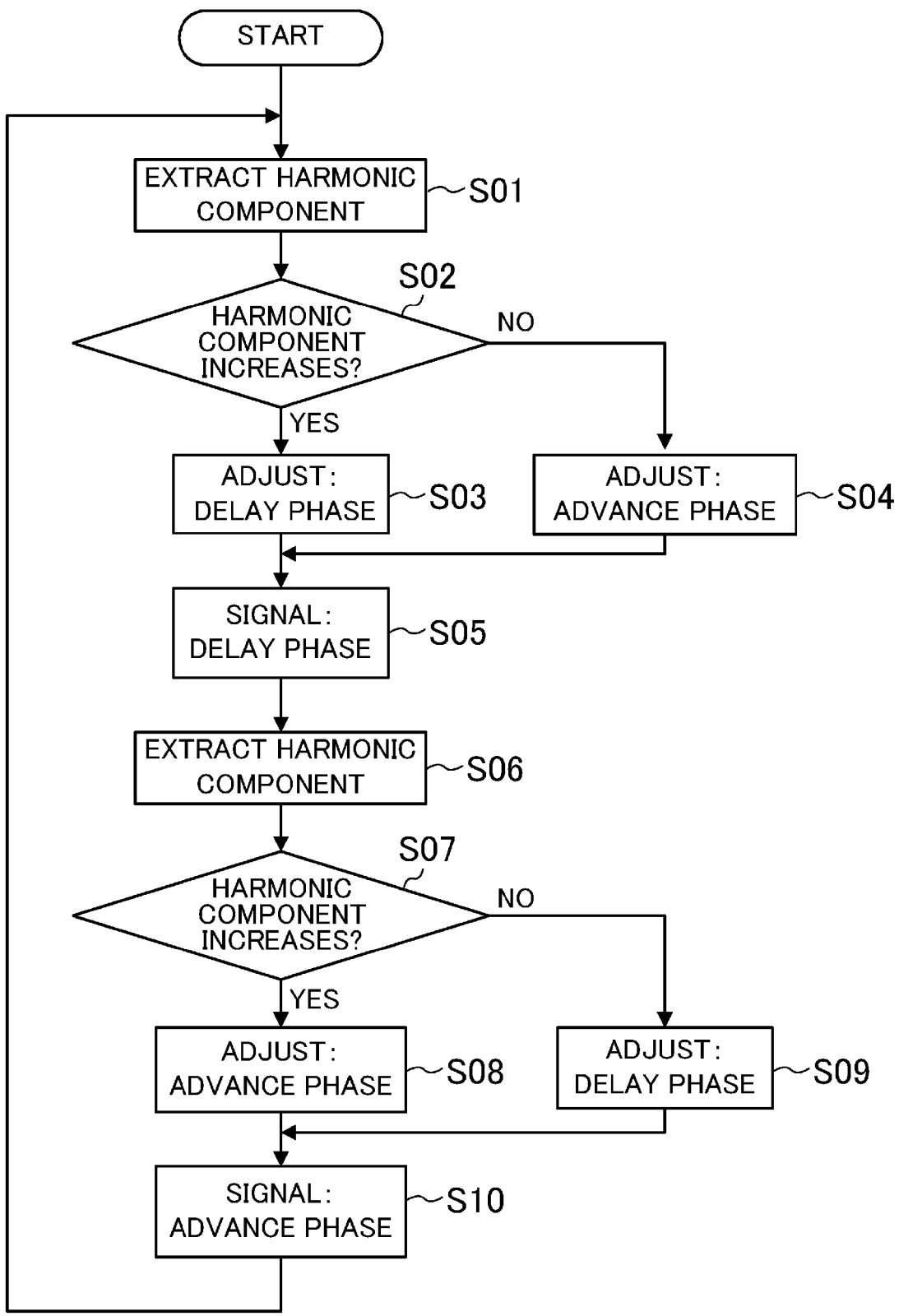
FIG. 6 is a flow chart illustrating voltage compensation operation by the voltage distortion corrector.

In this embodiment, the voltage distortion corrector (54) obtains the compensation voltages (vd_h and vq_h), and compensate the voltage reference values (vd* and vq*) using the compensation voltages (vd_h and vq_h). Thus, the output voltages of the inverter circuit (4) are compensated in accordance with the harmonic component caused by the distortion in the motor voltage. In this embodiment, the harmonic component caused by the distortion in the motor voltage is detected, and the degree of the compensation is adjusted. FIG. 6 is a flow chart illustrating voltage compensation operation by the controller (5). The controller (5) adjusts the compensation voltages (vd_h and vq_h) in accordance with an increase/decrease in the harmonic component caused by the distortion in the motor voltage before and after changing the compensation voltages (vd_h and vq_h). Specifically, the controller (5) adjusts the above-described phase ($\delta$) by what is called a "hill climbing method."

First, in step (S01), the voltage distortion corrector (54) extracts the harmonic component caused by the distortion in the motor voltage. In step (S02), the controller (5) compares the harmonic component caused by the distortion in the motor voltage, which has been extract in the step (S01), to the harmonic component caused by the distortion in the motor voltage, which has been extracted in advance, to determine an increase/decrease in the harmonic component caused by the distortion in the motor voltage. Where the harmonic component caused by the distortion in the motor voltage increases, the process moves to step (S03). Where the harmonic component does not increase, the process moves to step (S04). The controller (5) controls the phase adjuster (54a) to delay the phase ($\delta$) in the step (S03), and advances the phase ($\delta$) in the step (S04). After that, the process moves to step (S05), and the controller (5) delays the phase ($\delta$). The change amount of the phase in the step (S05) is greater than those in the step (S03) and the step (S04).

In step (S06), the voltage distortion corrector (54) extracts the harmonic component caused by the distortion in the motor voltage again. In step (S07), the controller (5) compares the harmonic component, which has been extracted in the step (S06), to the harmonic component caused by the distortion in the motor voltage, which has been extracted before adjusting the phase ($\delta$) to determine an increase/decrease in the harmonic component caused by the distortion in the motor voltage. Where the harmonic component caused by the distortion in the motor voltage increases, the process moves to step (S08). Where the harmonic component does not increase, the process moves to step (S09). The controller (5) controls the phase adjuster (54a) to advance the phase ($\delta$) in the step (S08), and delays the phase ($\delta$) in the step (S09). After that, the process moves to step (S10), and the controller (5) advances the phase ($\delta$). As such, the phase ($\delta$) is changed to search the phase ($\delta$) in which the harmonic component caused by the distortion in the motor voltage decreases.

Advantages of Embodiment

Figure 7A:
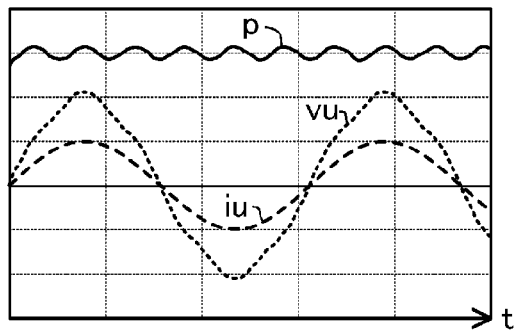
FIG. 7A illustrates waveforms of input power of a motor, a U-phase voltage, and a motor current, where the compensation voltage is not superimposed.
Figure 7B:
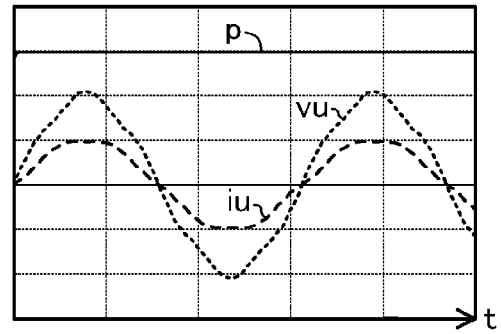
FIG. 7B illustrates waveforms of the input power, the phase voltage, and the motor current, where the compensation voltage is superimposed.

FIGS. 7A and 7B are waveform diagrams illustrating the advantages of the correction by the voltage distortion corrector (54). FIG. 7A is a waveform diagram illustrating input power (p) of a motor, a motor induced U-phase voltage (vu), and a U-phase current (iu)(i.e., a motor current), where the compensation voltages (vd_h and vq_h) are not superimposed. FIG. 7B is a waveform diagram illustrating the input power (p), the motor induced voltage (vu), and the phase current (iu)(i.e., a motor current), where the compensation voltages (vd_h and vq_h) are superimposed. In FIG. 7A, since a current with less distortion flows while the voltage contains distortion, the motor input power is distorted. Thus, the harmonic component contained in the motor power flows to the DC link voltage, the current at the power supply, and the power. On the other hand, in FIG. 7B, since a current having antiphase distortion to distortion in the voltage, the motor input power does not contain any harmonic component. As such, the compensation voltages (vd_h and vq_h) are properly superimposed, thereby allowing the motor current (iu) to contain the antiphase harmonic component to the distortion in the motor voltage, and reducing distortion in the input power of the motor, and eventually distortion in the current at the power supply, the power, and the DC link voltage.

In this embodiment, the phase ($\delta$) is searched in accordance with the operational state (e.g., the rotational speed or the load torque) of the motor (7), thereby effectively reducing the harmonic component caused by the distortion in the motor voltage, which flows to the power supply. That is, in this embodiment, in what is called a "capacitorless inverter," the power-supply harmonic caused by distortion in the motor voltage is reduced in accordance with the operational state of the motor.

In this embodiment, a signal with a reduced harmonic component caused by distortion in the motor current is input to the dq-axis current controller (53). This prevents unstable control caused by the disturbance of the harmonic.

In the inverter circuit (4), a period (what is called a "dead time") is conventionally provided, in which the upper- and lower-arms switching devices are both off in the same switching leg in switching the on/off states of the switching devices (Su, Sv, Sw, Sx, Sy, and Sz) to reduce short circuits of the upper- and lower-arms. However, by providing the dead time, the output voltage of the inverter, i.e., the input motor voltage contains voltage distortion, which is 6n times, where n is an integer, the fundamental frequency of the motor (7). If the input motor voltage contains a distortion component, the motor input power may also be distorted. As a result, the harmonic component contained in the motor power flows to the DC link voltage, the current at the power supply, and the power. Thus, providing the dead time may increase the power-supply harmonic. However, as in this embodiment, by controlling the compensation voltages (vd_h and vq_h) to reduce the component, which is 6n times the motor fundamental wave frequency contained in the DC link voltage, the power-supply harmonic caused by the dead time is reduced.

Other Embodiments

The harmonic component caused by the distortion in the motor voltage may be extracted by Fourier transform of an input current to the inverter circuit (4), input power to the inverter circuit (4), or input power to the motor.

Instead of adjusting the phase ($\delta$), the compensation voltages (vd_h and vq_h) may be controlled by changing amplitude (voltage amplitude (Vh)), or changing both of the phases ($\delta$) and the voltage amplitude (Vh).

Alternatively, one of the two harmonic component removers (52-1 and -2) may be omitted.

The harmonic component removers (52-1 and -2) may change the removal amount of the harmonic component caused by distortion in the motor current in accordance with any one of the rotational speed, the torque, and the electric power of the motor (7).

Figure 8:
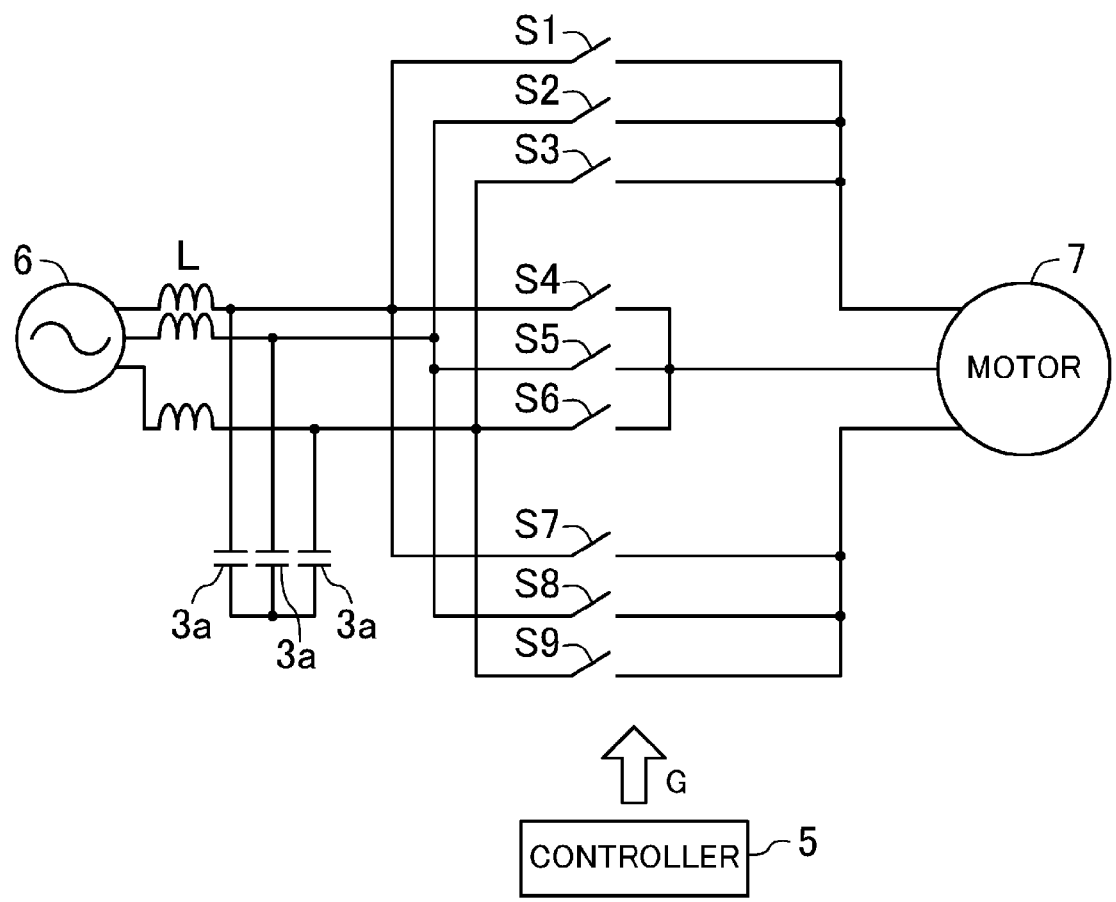
FIG. 8 is a block diagram illustrating an example configuration of a matrix converter.

The present disclosure is applicable to what is called a "matrix converter." FIG. 8 is a block diagram illustrating an example configuration of a matrix converter. In this example, nine switching devices (S1, S2, . . . , S9) connected to a three-phase AC power supply (6) switches three-phase AC and supplies the three-phase AC to the motor (7).

Figure 9:
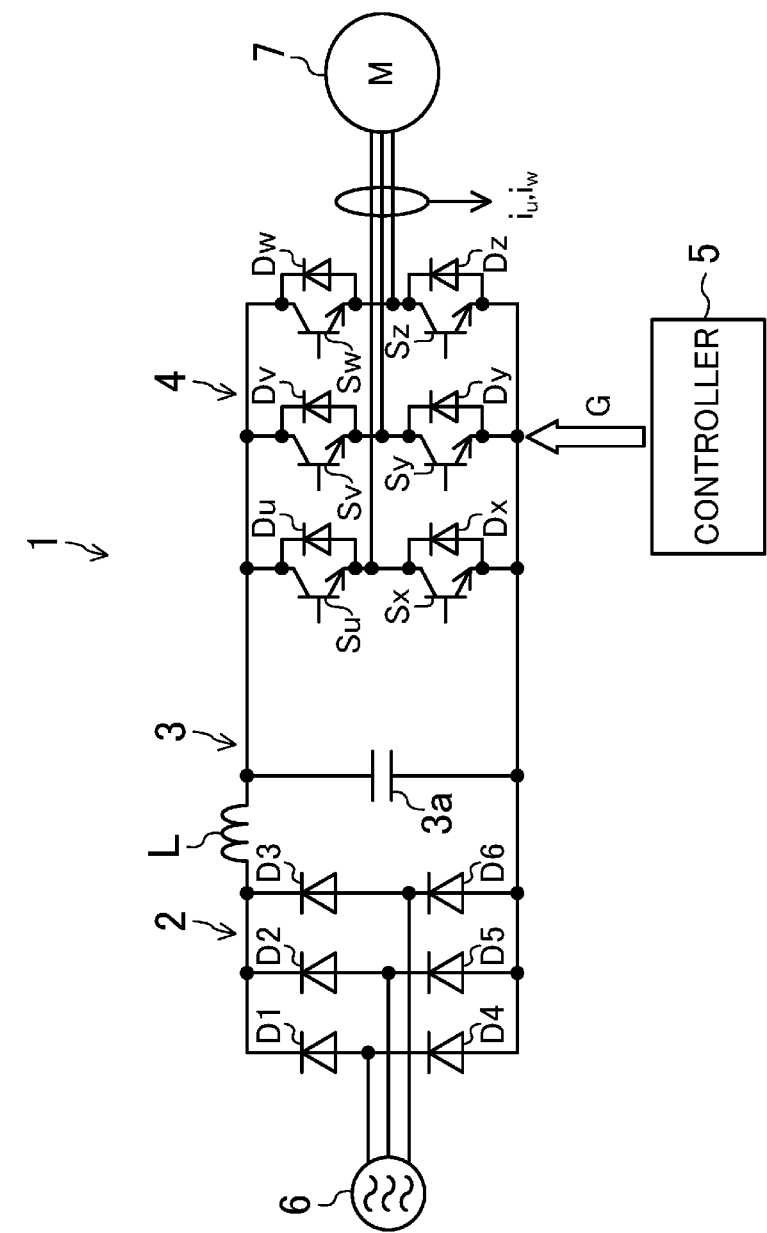
FIG. 9 is a block diagram illustrating an example configuration of a power conversion apparatus where an AC power supply is a three-phase AC power supply.

The AC power supply (6) may be a three-phase AC power supply. FIG. 9 is a block diagram illustrating an example configuration of a power conversion apparatus (1) where an AC power supply is a three-phase AC power supply (6). As shown in the figure, a converter circuit (2) is a diode bridge circuit, in which six diodes (D1-D6) are connected together in a bridge configuration. These diodes (D1-D6) perform full-wave rectification of an AC voltage of the three-phase AC power supply (6) to convert the AC voltage to a DC voltage. In the configuration of the converter circuit (2), the frequency of the voltage pulsation of the DC link (3) is six times the power-supply frequency.

The voltage distortion corrector (54) may extract a harmonic component from input power to the motor (7), or may extract harmonic components from the voltages of capacitors (3a).

INDUSTRIAL APPLICABILITY

The present disclosure is useful for a power conversion apparatus converting input power to predetermined power by switching.

DESCRIPTION OF REFERENCE CHARACTERS

1 Power Conversion Apparatus
2 Converter Circuit
3 DC Link
3a Capacitor
4 Inverter Circuit
5 Controller
6 AC Power Supply
7 Motor
54 Voltage Distortion Corrector

The invention claimed is:

1. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
   a controller configured to control switching of the switching devices;
   a capacitor configured to smooth a ripple generated by the switching of the switching devices;
   a current controller configured to output command values controlling a current flowing to the motor; and
   a voltage distortion corrector configured to detect a harmonic component caused by distortion in input power to the motor, and to superimpose on an output of the current controller, compensation values distorting a motor current in accordance with a value of the harmonic component to reduce the harmonic component.

2. The power conversion apparatus of claim 1, wherein the voltage distortion corrector extracts the harmonic component from the input power to the motor.

3. The power conversion apparatus of claim 2, wherein the voltage distortion corrector adjusts at least one of phases or amplitude of the compensation values.

4. The power conversion apparatus of claim 2, wherein the voltage distortion corrector adjusts amplitude of the compensation values in accordance with any one of rotational speed, a torque, or electric power of the motor.

5. The power conversion apparatus of claim 2, wherein each of the compensation values has a frequency component which is 6n times, where n is an integer, a fundamental frequency of a voltage of the motor.

6. The power conversion apparatus of claim 1, wherein the voltage distortion corrector extracts the harmonic component from a voltage of the capacitor.

7. The power conversion apparatus of claim 6, wherein each of the compensation values has a frequency component which is 6n times, where n is an integer, a fundamental frequency of a voltage of the motor.

8. The power conversion apparatus of claim 1, wherein the voltage distortion corrector extracts the harmonic component from an input current to the power conversion apparatus.

9. The power conversion apparatus of claim 8, wherein each of the compensation values has a frequency component which is 6n times, where n is an integer, a fundamental frequency of a voltage of the motor.

10. The power conversion apparatus of claim 1, further comprising:
    a converter circuit configured to perform full-wave rectification of the input AC power, wherein
    the capacitor is connected in parallel to outputs of the converter circuit to form a DC link and outputs a pulsating DC voltage,
    the switching devices form an inverter circuit to convert an output of the DC link to AC power by the switching and to supply the AC power to the motor, and
    the controller controls the switching such that currents of the motor pulsate in synchronization with pulsation of a power-supply voltage.

11. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
    a controller configured to control switching of the switching devices;
    a capacitor configured to smooth a ripple generated by the switching of the switching devices;
    a current controller configured to control a current flowing to the motor; and
    a voltage distortion corrector configured to detect a harmonic component caused by distortion in input power to the motor, and to superimpose compensation values on an output of the current controller in accordance with a value of the harmonic component, wherein
    the voltage distortion corrector extracts the harmonic component from the input power to the motor, and
    the voltage distortion corrector performs Fourier transform based on a period of an integral multiple of a half period of the AC power supply to extract the harmonic component.

12. The power conversion apparatus of claim 11, wherein the voltage distortion corrector adjusts the compensation values in accordance with an increase/decrease in the harmonic component before and after changing the compensation values.

13. The power conversion apparatus of claim 11, wherein each of the compensation values has a frequency component which is 6n times, where n is an integer, a fundamental frequency of a voltage of the motor.

14. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
- a controller configured to control switching of the switching devices;
- a capacitor configured to smooth a ripple generated by the switching of the switching devices;
- a current controller configured to control a current flowing to the motor; and
- a voltage distortion corrector configured to detect a harmonic component caused by distortion in input power to the motor, and to superimpose compensation values on an output of the current controller in accordance with a value of the harmonic component, wherein
- the voltage distortion corrector extracts the harmonic component from the input power to the motor, and
- the voltage distortion corrector adjusts the compensation values in accordance with an increase/decrease in the harmonic component before and after changing the compensation values.

15. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
- a controller configured to control switching of the switching devices;
- a capacitor configured to smooth a ripple generated by the switching of the switching devices;
- a current controller configured to control a current flowing to the motor; and
- a voltage distortion corrector configured to detect a harmonic component caused by distortion in input power to the motor, and to superimpose compensation values on an output of the current controller in accordance with a value of the harmonic component, wherein
- the voltage distortion corrector extracts the harmonic component from a voltage of the capacitor, and
- the voltage distortion corrector performs Fourier transform based on a period of an integral multiple of a half period of the AC power supply to extract the harmonic component.

16. The power conversion apparatus of claim 15, wherein the voltage distortion corrector adjusts the compensation values in accordance with an increase/decrease in the harmonic component before and after changing the compensation values.

17. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
- a controller configured to control switching of the switching devices;
- a capacitor configured to smooth a ripple generated by the switching of the switching devices;
- a current controller configured to control a current flowing to the motor; and
- a voltage distortion corrector configured to detect a harmonic component caused by distortion in input power to the motor, and to superimpose compensation values on an output of the current controller in accordance with a value of the harmonic component, wherein
- the voltage distortion corrector extracts the harmonic component from an input current to the power conversion apparatus, and
- the voltage distortion corrector performs Fourier transform based on a period of an integral multiple of a half period of the AC power supply to extract the harmonic component.

18. The power conversion apparatus of claim 17, wherein the voltage distortion corrector adjusts the compensation values in accordance with an increase/decrease in the harmonic component before and after changing the compensation values.

19. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
- a controller configured to control switching of the switching devices;
- a capacitor configured to smooth a ripple generated by the switching of the switching devices;
- a current controller configured to control a current flowing to the motor; and
- a voltage distortion corrector configured to detect a harmonic component caused by distortion in input power to the motor, and to superimpose compensation values on an output of the current controller in accordance with a value of the harmonic component, wherein
- the voltage distortion corrector extracts the harmonic component from a voltage of the capacitor, and
- the voltage distortion corrector adjusts the compensation values in accordance with an increase/decrease in the harmonic component before and after changing the compensation values.

20. A power conversion apparatus equipped with switching devices to perform power conversion of input AC power supplied from an AC power supply to output AC power having a predetermined voltage and a predetermined frequency, and to supply the output AC power to a motor connected thereto, the apparatus comprising:
- a controller configured to control switching of the switching devices;
- a capacitor configured to smooth a ripple generated by the switching of the switching devices;
- a current controller configured to control a current flowing to the motor; and
- a voltage distortion corrector configured to detect a harmonic component caused by distortion in input power to the motor and to superimpose compensation values on an output of the current controller in accordance with a value of the harmonic component, wherein
- the voltage distortion corrector extracts the harmonic component from an input current to the power conversion apparatus, and
- the voltage distortion corrector adjusts the compensation values in accordance with an increase/decrease in the harmonic component before and after changing the compensation values.

* * * * *